Sept. 15, 1942. W. L. HANSEN 2,295,786
SYNCHRONOUS MOTOR
Filed April 29, 1940
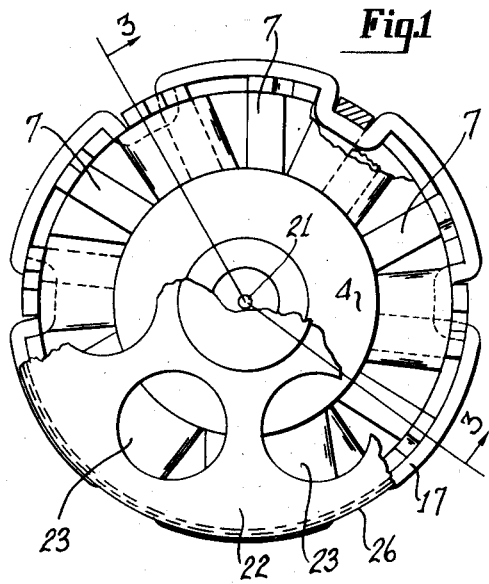
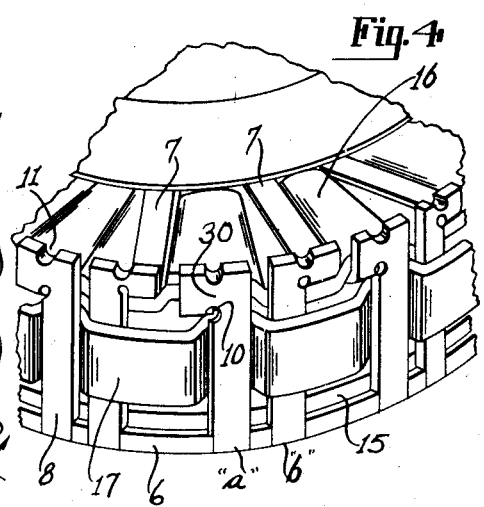
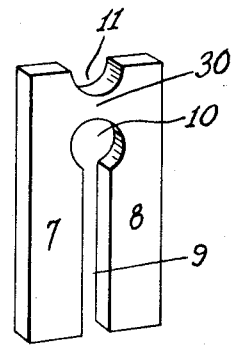
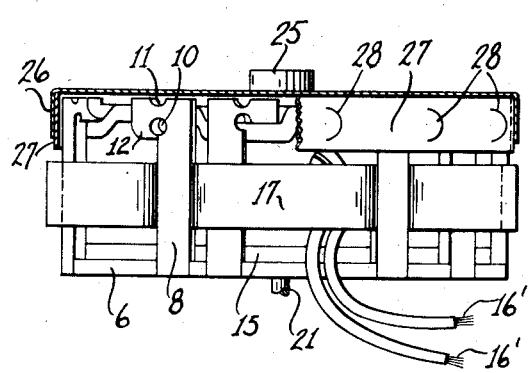
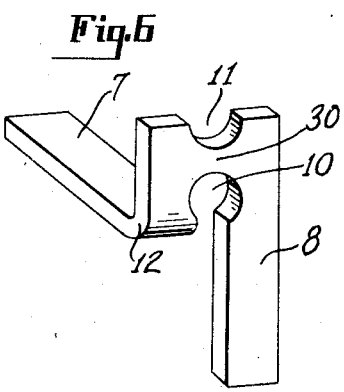
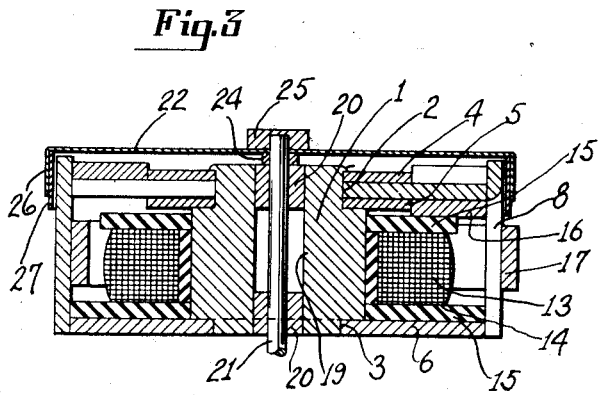
INVENTOR
WILLIAM L. HANSEN
BY Toulmin & Toulmin
ATTORNEYS Patented Sept. 15, 1942

2,295,786

UNITED STATES PATENT OFFICE 2,295,786

SYNCHRONOUS MOTOR

William L. Hansen, Princeton, Ind., assignor to Hansen Mfg. Company, Inc., Princeton, Ind., a corporation of Indiana Application April 29, 1940, Serial No. 332,181

12 Claims. (Cl. 172—278)

This invention relates to electric motors, and in particular, to electric synchronous motors such as are employed for operating clocks.

The primary object of the present invention is to provide an inexpensive, easy to manufacture and assemble, a slow speed electric synchronous motor having self-starting characteristics and a relatively low current consumption for a given power output.

Another object is to provide a self-starting slow speed synchronous motor having field poles of an inexpensive character and shaded by an undulating shading ring which passes around three sides of alternate poles as it proceeds around the field structure.

Still another object is to provide a self-starting slow speed synchronous motor in which the effective areas of the field of poles extend for a considerable distance within the rotor, thus providing strong starting and operating characteristics for the motor.

Another object is to provide a slow speed self-starting synchronous motor having a field structure consisting of two spaced poles coming from opposite ends of a field core, the inner set of poles consisting of a disk with radially projecting fingers and metallically connected to the outer set which consists of a disk provided with axially projecting fingers, the tips of the two sets of fingers extending upwardly for a considerable distance into the rotor in order that the latter will cut the maximum lines of magnetomotive force which passes between the two sets of poles.

Still another object is to provide a slow speed self-starting synchronous motor having a field structure consisting of a plurality of disks mounted upon a magnetic hub surrounded by a field coil, one set of disks mounted at one end of said hub having axially projecting pole pieces, and another disk mounted on the opposite side of the hub having radially projecting pole pieces, said pole pieces being magnetically connected together and having tips which extend well into the rotor, the radial pole pieces being adapted to receive a disk of non-magnetic material for shading adjacent radial poles from one another and the axially projecting pole pieces being adapted to receive a second ring of non-magnetic material to shade adjacent axial poles from one another.

The more general object is to provide a slow speed synchronous motor of a shaded pole self-starting type and having a field structure which is inexpensive to fabricate and easy to assemble, the field structure being of such a character that it extends for considerable distance within the magnetic boundary of the rotor.

The invention will be readily understood when reference is made to the following description and the accompanying drawing in which Figure 1 is a top plan view of the motor of this invention with portions of the rotor structure and field core structure broken away, respectively, to disclose the structure there beneath;

Figure 2 is a side elevation of the motor shown in Figure 1, with the rotor structure illustrated in diametral cross-section in order to show the field structure more clearly;

Figure 3 is an axial section through the motor of Figure 1, taken along the line 3—3 in Figure 1;

Figure 4 is an enlarged fragmentary top perspective view of the motor of Figures 1, 2 and 3 with the rotor structure removed;

Figure 5 is a perspective view of a detail of the magnetic field structure and specifically showing the manner in which the radially and axially extending pole pieces are formed;

Figure 6 is a view similar to Figure 5 except that it shows the manner in which the radially extending pole pieces are bent into position.

Referring to the drawing in detail numeral 1 designates a magnetic tubular hub having reduced diameter portions 2, 3 upon which are mounted the inner and outer field pole assemblies. The inner field pole assembly consists of a pair of disks 4, 5 of magnetic material, each being provided with rectangularly shaped recesses of limited width and formed by depressing each disk around its periphery to form the equidistantly spaced recesses or depressions. In the case of the upper disk 4, the metal at each recess extends upwardly while in the case of the disk 5 the metal of each recess extends downwardly.

The disks 4 and 5 are placed in superposition in such a way that the recesses in the disks are in alignment with one another so that one looking at the edge of these disks would see a number of rectangularly shaped openings equidistantly positioned about the periphery of the disk pair. The purpose for these openings will appear presently. At the other side of the tubular hub 1 there is a disk 6 fabricated of magnetic material and secured in any suitable manner to the reduced diameter portion 3. The disk 6 is provided about its periphery with a number of slots arranged in pairs, each pair being equidistantly spaced from the next pair. In addition to the magnetic hub and the disks 4, 5, 6, the magnetic field structure is completed by the employment of a number of radially extending pole pieces 7 and a corresponding number of axially or laterally extending pole pieces 8.

As can be seen more clearly in Figures 5 and 6, each pair of pole pieces 7, 8 is punched out of the same sheet of magnetic material. The sheet is provided with a slot 9 and a round hole 10 to form, roughly speaking, an opening of key-hole configuration. Directly above the aperture of hole 10 there is a recess 11, the effect of the two openings 10 and 11 being to reduce the cross-sectional area of the metal at the top of each blank. The reason for this reduction in cross-sectional area will be pointed out hereinafter.

As shown in Figure 6, the next step is to bend the leg 7 at the position 12 and into a horizontal direction, leaving the other leg 8 in its vertical position. The legs or pole pieces 7 are adapted to be inserted into the openings appearing at the edge of the disks 4, 5 and the legs or pole pieces 8 are adapted to be fitted into the slots which appear about the periphery of the lower disk 6. It will be understood that before the pole pieces 8 are placed into position the coil for the magnetic field structure is mounted within the motor. This coil is designated in Figure 3 by reference character 13 and is wound on a drum 14 of insulating material and contained between side members 15, also of insulating material. The drum 14 is mounted on the hub 1. Insulated wires 15' may be taken from the coil 13 as indicated in Figure 2.

The improved motor is of the split phase type so that shading coils for producing an out of phase magnetic field in the alternate pole pieces are required. Two such shading rings 16 and 17 are illustrated, the ring 16 serving to shade the alternate pole pieces 7 and the ring 17 serving to shade the alternate pole pieces 8. The ring 16 preferably takes the form of a ribbon, fabricated of non-magnetic material such as copper and having an undulating shape so as to extend about three sides including the top of the alternate radially extending pole pieces 7 and flatwise under the remaining alternate pole pieces 7. Similarly, the shading ring 17 is constituted of a metal such as copper and takes the form of a ring having an undulating shape and extending around three sides of one set of alternate sides of one set of alternate pole pieces 8 and flatwise about the outer side of the other set of alternate pole pieces 8.

It is well understood in the art that those pole pieces about which the shading rings 16 and 17 extend on three sides thereof represent shaded poles in that the magnetic field passing through these pole pieces is out of phase with respect to the field passing through the remaining or alternate pole pieces. Consequently, during the starting period considerable current is induced in the shading rings which causes in effect a rotating field within the magnetic field structure. The shading rings 16, 17 are held in position in any suitable manner but in practice I have found that the friction between these rings and contiguous parts is more than sufficient rigidly to maintain these rings in place.

Assuming that the field coil 13 has been mounted in position on the hub 1, the next step is to assemble the two disks 4 and 5 on the reduced diameter portion 2 of the hub. The horizontally and vertically extending shading rings 16 and 17 are then temporarily held in the positions which they are to assume in the finished motor. The next step is to assemble and mount the pole pieces 7 and 8. This is done by inserting each alternate pole piece 7 under the upwardly extending portions of the horizontal shading ring and into its individual opening formed at the edges of the disks 4, 5. The remaining alternate pole pieces 7 are placed over the downwardly extending portions of the horizontal shading ring 16 and these pole pieces in turn are also inserted into the remaining openings formed at the edge of the disk 4, 5. The legs or pole pieces 8 are then pressed downwardly, one on one side of the vertically extending shading ring 17 and the adjacent piece on the other side of the shading ring, finally causing the lower ends of the pole pieces 8 to be received by the slots formed around the edge of the disk 6. At this point the lower ends of the pole pieces 8 are peened or otherwise secured to the disk 6 at the peripheral slots.

It was pointed out hereinbefore that the pole pieces 8 are not equidistantly spaced about the motor but instead appear as pairs of adjacently positioned poles, each pair being equidistantly spaced by having a considerable distance between the pole of one pair and the pole of the next adjacent pair. This effect can be seen in Figure 4 in which the elements marked "a," "b" constitute one pair. In order to obtain this pairing effect, it may be desirable to bend the opposite leg at the point 12 of the blank shown in Figure 5 for every other pair of pole pieces 7, 8. Thus, for one pair of pole pieces the lefthand leg of the blank shown in Figure 5 will be bent at the position 12 to constitute a radially extending pole piece 7, whereas at the next pair of pole pieces the righthand leg would be bent to constitute the radially extending pole piece and the lefthand leg would be permitted to remain in its vertical position. This would be the opposite condition from that shown in Figure 6. It will then be evident that if the pole pieces 7 are assembled and inserted between the disks 4, 5 as explained above, the vertically extending pole pieces 8 will be brought together to constitute pairs of pole pieces of which the pairs will be equidistantly spaced about the motor.

It is further evident that as the pole pieces 7, 8 are assembled and securely hold the shading rings in position and assuming that the lower ends of the legs 8 are secured in the disk 6, the radially extending portions 7 are prevented from moving upwardly on account of the recesses at the edge of the disk 4, 5 and the pole pieces 8 are prevented from moving outwardly on account of their securement to the lower disk. Thus, all of the pole pieces are maintained rigidly in position. It is also apparent that inasmuch as the shading rings 16, 17 are of an undulating character and weave in and out of the legs 7 and 8, the rings too are securely held in position.

The upper end of the hub 1 may be peened over if desired on to the upper surface of the disk 4 and the lower edge of the hub 1 may be peened over on to the lower surface of the disk 6. Thus all parts of the magnetic circuit and the shading rings are rigidly secured to the hub member. The hub member 1 is provided with a bore 19 which is closed at each end by metal plugs 20 having an opening for receiving the shaft 21 of a rotating disk 22. This disk is preferably made of aluminum and provided with a number of large round openings 23 equidistantly spaced, the purpose of which is to reduce the weight of the motor as much as possible. There is a thrust washer between the disk 22 and the upper part of metal plugs 20, and the shaft 21 terminates in a metal cap 25 positioned on top of the disk. The disk 22 is provided with a flange 26, and fitted within this flange there is the rotor proper 27 constituted of a thin band of magnetic steel.

This band is provided with incisions 28 equidistantly spaced and preferably of an arcuate shape, the purpose of which is to divide the area of the band into a number of indivdual poles. These incisions may be obtained in any suitable manner, but I have found it convenient to punch the arcuate openings while the strip is in a flat condition, striking up the metal at each opening and then bending the metal back to its original shape, thus assuring a clean-cut incision. The band of steel is of a flexible resilient character so that it can be sprung into position within flange 26. It will be noted that the width of the rotor 27 is somewhat wider than the width of the flange the band extending downwardly to a position somewhat below the bend 12 in the pole piece 7.

Referring more particularly to Figures 3 and 6 it will further be noted that there is considerable length of pole extending upwardly from the horizontal portion 7 and this arrangement in effect brings that portion indicated at 30 in Figure 6 of restricted cross-sectional area well up into the rotor 27. Actually, the vertical portions of the poles 7, 8 extend into the rotor as far as the upper edge of the band 27. It will be understood that the magnetic field gradient has its highest value at the portion 30 at which point the poles 7 and 8 are metallically connected and the concentration or intensification of the field at this point tends to cause considerable flux to be radiated and to be intercepted by the rotor 27.

In the prior art forms of motors it was believed to be unnecessary to extend the pole pieces much above the height of the radial pole pieces 7, but I have found that by appreciably raising the height of the pole pieces so that the effective portions of the pole pieces will be positioned well up inside the rotor, the starting and operating torques of the improved motor are considerably enhanced.

In the operation of the motor, the field coil 13 is energized by connecting the leads 16' to a suitable source of alternating current, such as the ordinary house-wiring circuit of 110 volt, 60 cycle alternating current. The alternations of the current alternately magnetize the field poles 7, 8 with opposite polarities but the shaded field poles undergo a phase lag relative to the unshaded poles so that a starting force is applied to the rotor, causing it to rotate with the shaft 21. If desired, a lubricant, either in solid or liquid form may be provided for the shaft within the bore 19 between the plugs 20. The motor shaft 21 is preferably connected to reduction gearing (not shown) by which its speed is reduced to the one R. P. M. speed ordinarily employed in driving electrical synchronous clocks.

It has been found by actual test that a motor of this invention in which the vertical portions of the pole pieces 7 and 8 extend up into the rotor 27 for a considerable distance possesses an unusually low current consumption, in the neighborhood of only a few watts, as compared with the prior art motors having a current consumption running as high as twice this amount. A motor of the improved type also possesses considerable starting and running torque.

From the foregoing it is evident that I have disclosed an improved form of synchronous motor in which the pole pieces are not only inexpensive to make since they can be punched out of sheet metal in quantity production, but also these pole pieces can be readily assembled. The only permanent structural connections in the improved motor are at the position where the hub 1 is peened over on to the upper surface of the disk 4, also where the lower ends of the vertically extending pole pieces 8 are peened into the slots at the periphery of the lower disk 6. The shading rings are securely held in position by this construction. It is further evident that by extending the pole pieces well up into the rotor where they will be most effective in producing the necessary flux which the rotor is to intercept, the motor is given highly desirable starting and operating characteristics.

Having thus fully described my invention, what I claim as new and desire to secure by Letters Patent is:

1. In a synchronous motor a magnetic core, a magnetic field member mounted on one end of said core and having outer pole pieces disposed axially in a substantially cylindrical path and having the same polarity, a second magnetic field member mounted on the other end of said core and having inner pole pieces all of the same polarity but different from that of the axial pole pieces, said inner pole pieces being disposed radially with respect to said second field member, each adjacent pair of said outer and inner pole pieces being constituted of a single metal element, and a field energizing winding associated with said core.

2. In a synchronous motor, a magnetic core, a magnetic field member mounted on one end of said core and having outer pole pieces disposed axially in a substantially cylindrical path and having the same polarity, a second magnetic field member mounted on the other end of said core and having inner pole pieces all of the same polarity but different from that of the axial pole pieces, said inner pole pieces being disposed radially with respect to said second field member, the adjacent pair of said inner and outer pole pieces being formed from a single piece of metal, shaped to size and configuration, and the radial pole piece being bent from the body of said single piece of metal.

3. As an article of manufacture a pole piece for an electrical motor comprising a piece of magnetic metal provided with a slot which extends from one end of the piece of metal and terminating in a round opening, the portion on one side of the slot being bent angularly with respect to the portion on the other side of the slot.

4. As an article of manufacture a pole piece for an electrical motor comprising a rectangular piece of magnetic metal provided with a slot extending from one side of the metal piece and terminating in a round opening, and a circular recess formed in that side of the piece directly opposite the side from which the slot extends.

5. As an article of manufacture a rectangular piece of magnetic metal provided with a slot which terminates in a round opening to form two legs, one of said legs being bent at an angle with respect to the other leg.

6. As an article of manufacture a rectangular piece of magnetic metal provided with a slot which terminates in a round opening to form two legs, one of said legs being bent at an angle with respect to the other leg, and a recess in that side of the piece of metal opposite the side from which said slot extends.

7. As an article of manufacture a pole piece for electrical motors comprising a piece of magnetic metal having a slot which extends from one side of the metal piece and terminates within the body of the metal whereby a leg is formed at each side of the slot, said metal piece being provided with a portion having a cross-sectional area less than the cross-sectional area of either of said legs, one of said legs extending at a right angle with respect to the other leg so as to form a radially extending pole piece when the other leg forms an axially extending pole piece.

8. As an article of manufacture a pole piece for electrical motors comprising a rectangular piece of magnetic metal having a slot which extends from one side of the metal piece and terminates within the body of the metal whereby a leg is formed at each side of the slot, said metal piece being provided with a portion having a cross-sectional area less than the cross-sectional area of either of said legs, one of said legs being bent in a direction at right angles to the other of said legs.

9. In a synchronous motor, a magnetic field circuit comprising a hub, radially extending disks at the opposite ends of said hub, and pole pieces having portions which extend radially from one of said disks and another portion which extends vertically toward the other of said disks, each pair of pole pieces composed of one radial and one axial pole piece being formed in one piece and secured to said disks, a field energizing winding associated with said magnetic field circuit and a rotor rotatably mounted adjacent said pole pieces, said pole pieces having an upstanding tip which extends inside of said rotor.

10. In a synchronous motor, a magnetic field circuit comprising a hub, radially extending disks at opposite ends of said hub, said disks being provided with peripheral openings, and pole pieces having portions extending radially from one of said disks and other portions extending vertically toward the other of said disks, each pair of pole pieces being formed in one piece and secured in the peripheral openings of said disks.

11. In a synchronous motor, a magnetic field circuit comprising a hub, radially extending disks at the opposite ends of said hub, said disks being provided with peripheral openings, and pole pieces having portions extending radially from one of said disks, a shading ring weaving in and out to shade certain of the radially extending pole portions, said pole pieces having other portions extending vertically toward the other of said disks, each pair of pole pieces being formed in one piece and secured in the peripheral openings of said disks.

12. In a synchronous motor, a magnetic field circuit comprising a hub, radially extending disks at the opposite ends of said hub, said disks being provided with peripheral openings, and pole pieces having portions extending radially from one of said disks, a shading ring weaving in and out to shade certain of the radially extending pole portions, said pole pieces having other portions extending vertically toward the other of said disks, each pair of pole pieces being formed in one piece and secured in the peripheral openings of said disks, and a shading ring weaving the vertically extending pole pieces.

WILLIAM L. HANSEN.